(12) United States Patent
Pawaskar

(10) Patent No.: US 11,165,628 B2
(45) Date of Patent: Nov. 2, 2021

(54) SYSTEMS AND METHODS FOR REGISTERING COMPUTER SERVER EVENT NOTIFICATIONS

(71) Applicant: Worldpay, LLC, Symmes Township, OH (US)

(72) Inventor: Sachin Pawaskar, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 16/696,656

(22) Filed: Nov. 26, 2019

(65) Prior Publication Data

US 2020/0099571 A1  Mar. 26, 2020

Related U.S. Application Data

(63) Continuation of application No. 16/391,838, filed on Apr. 23, 2019, now Pat. No. 10,541,859, which is a continuation of application No. 15/368,162, filed on Dec. 2, 2016, now Pat. No. 10,320,603.

(51) Int. Cl.
  *H04L 12/24* (2006.01)
(52) U.S. Cl.
  CPC .......... *H04L 41/06* (2013.01); *H04L 41/0604* (2013.01); *H04L 41/069* (2013.01); *H04L 41/24* (2013.01); *H04L 41/28* (2013.01)
(58) Field of Classification Search
  CPC ..... H04L 41/06; H04L 41/24; H04L 41/0604; H04L 41/28; H04L 41/069
  See application file for complete search history.

(56) References Cited

U.S. PATENT DOCUMENTS

| | | | | |
|---|---|---|---|---|
| 6,359,557 B2 * | 3/2002 | Bilder | ................ | G08B 21/0415 |
| | | | | 340/531 |
| 7,181,490 B1 * | 2/2007 | Harvey | ................... | H04L 67/26 |
| | | | | 709/203 |
| 8,051,125 B2 * | 11/2011 | Lum | ................... | H04N 1/32561 |
| | | | | 709/201 |
| 8,825,798 B1 | 9/2014 | Johnson et al. | | |
| 9,635,011 B1 | 4/2017 | Wu et al. | | |
| 9,967,145 B2 * | 5/2018 | Kim | ................... | H04L 41/082 |
| 10,320,603 B1 * | 6/2019 | Pawaskar | ................ | H04L 41/24 |
| 10,630,534 B1 * | 4/2020 | Pawaskar | ................ | H04L 41/24 |
| 2002/0010803 A1 | 1/2002 | Oberstein et al. | | |
| 2002/0126811 A1 | 9/2002 | Aschir et al. | | |
| 2004/0122892 A1 * | 6/2004 | Brittenham | ............. | G06F 9/542 |
| | | | | 709/203 |
| 2006/0161951 A1 * | 7/2006 | Hindle | ................. | H04N 21/235 |
| | | | | 725/46 |

(Continued)

*Primary Examiner* — Oanh Duong
(74) *Attorney, Agent, or Firm* — Bookoff McAndrews, PLLC

(57) ABSTRACT

A system for secure transmission of business event notifications includes a memory, at least one processor, a service gateway configured to: publish application programming interfaces (APIs) for secure transmission of business event notifications, a notification server configured to: publish APIs for secure transmission of business event notifications corresponding to the APIs published by the service gateway, obtain a new business event to report, determine a partner to receive a notification of the new business event, transmit an event notification to the partner by way of the service gateway APIs, and register the event notification in a database.

20 Claims, 17 Drawing Sheets

(56) References Cited

U.S. PATENT DOCUMENTS

| | | | |
|---|---|---|---|
| 2007/0050630 A1* | 3/2007 | Kumar | H04L 63/08 |
| | | | 713/182 |
| 2007/0165615 A1 | 7/2007 | Shin et al. | |
| 2007/0282959 A1 | 12/2007 | Stern | |
| 2008/0216153 A1 | 9/2008 | Aaltonen et al. | |
| 2010/0280909 A1 | 11/2010 | Zhang et al. | |
| 2011/0214131 A1 | 9/2011 | Luna | |
| 2011/0314144 A1 | 12/2011 | Goodman | |
| 2012/0236719 A1 | 9/2012 | Kikuzuki et al. | |
| 2014/0195476 A1 | 7/2014 | Sxhmidt | |
| 2015/0248276 A1* | 9/2015 | Chan | G06F 8/30 |
| | | | 719/328 |
| 2015/0279426 A1* | 10/2015 | Maurer | G11B 27/28 |
| | | | 386/241 |
| 2015/0331729 A1* | 11/2015 | Kurokawa | H04L 67/40 |
| | | | 709/203 |
| 2015/0350092 A1* | 12/2015 | Kwon | H04L 67/10 |
| | | | 709/223 |
| 2016/0103750 A1* | 4/2016 | Cooper | G06F 9/542 |
| | | | 719/328 |
| 2016/0124742 A1* | 5/2016 | Rangasamy | H04L 67/10 |
| | | | 717/103 |
| 2016/0212110 A1 | 7/2016 | Barkie et al. | |
| 2016/0346673 A1* | 12/2016 | Maggio | A63F 13/25 |
| 2017/0085624 A1* | 3/2017 | Mukherjee | G06F 9/542 |
| 2017/0255934 A1* | 9/2017 | Clark | G06Q 20/405 |
| 2018/0054351 A1* | 2/2018 | Bhandari | H04L 41/0604 |

* cited by examiner

SYSTEMS AND METHODS FOR REGISTERING COMPUTER SERVER EVENT NOTIFICATIONS

CROSS-REFERENCE TO RELATED APPLICATION(S)

This patent application is a continuation of and claims the benefit of priority to U.S. patent application No. 16/391,838, filed Apr. 23, 2019, which is a continuation of and claims the benefit of priority to U.S. patent application No. 15/368,162, filed on Dec. 2, 2016, now U.S. Pat. No. 10,320,603, issued Jun. 11, 2019, the entireties of which are incorporated herein by reference.

TECHNICAL FIELD

The present disclosure relates generally to the field of inter-system computer communications and, more particularly, to provide secure transmission and subscription of computer server event notifications between systems.

BACKGROUND

In distributed computing systems, such as one supporting collaborative practices including, for example, financial services and electronic payment transactions, events arising within one distributed partner's environment may be significant to other distributed partners. Events may be related to, for example, business processes, data synchronization, updating status of records, error conditions, etc. Thus, it is important that such distributed systems provide mechanisms for notifying such events to other partners within the distributed computing system. Existing distributed computing systems rely, for example, on file transfers or on polling application programming interfaces (APIs), etc. for computer server event notifications or calling partner APIs. However, these mechanisms suffer from high computing resource costs, delays and lack of security, and may be subject to changes in underlying APIs that force changes in other parts of the distributed system.

Accordingly, there is a need for methods and systems for providing transmission and registration of computer server event notifications between disparate systems that are efficient, secure and scalable.

SUMMARY

According to certain aspects of the present disclosure, systems and methods are disclosed for providing secure transmission of business event notifications.

In one embodiment, a system is disclosed for secure transmission of computer server event notifications. The system comprises: a memory, at least one processor, a service gateway configured to: publish application programming interfaces (APIs) for secure transmission of computer server event notifications over a computer network, a notification server configured to: publish APIs for secure transmission of computer server event notifications corresponding to the APIs published by the service gateway, obtain a new computer server event to report, determine, using a hardware processor, a partner to receive a notification of the new computer server event, transmit, over the computer network, an event notification to the partner by way of the service gateway APIs, and register the event notification in a database.

In another embodiment, a method is disclosed for secure transmission of computer server event notifications. The method includes: publishing application programming interfaces (APIs) for secure transmission, over a computer network, of computer server event notifications corresponding to APIs published by a service gateway, obtaining a new computer server event to report, determining, using a hardware processor, a partner to receive a notification of the new computer server event, transmitting, over the computer network, an event notification to the partner by way of the service gateway APIs, and registering the event notification in a database.

In accordance with another embodiment, a non-transitory machine-readable medium is disclosed that stores instructions that, when executed by a computer, cause the computer to perform a method for secure transmission of computer server event notifications. The method includes: publishing application programming interfaces (APIs) for secure transmission, over a computer network, of computer server event notifications corresponding to APIs published by a service gateway the APIs published by the service gateway including features for secure transmission of event notifications, obtaining a new computer server event to report, determining, using a hardware processor a partner to receive a notification of the new computer server event, transmitting, over the computer network, an event notification to the partner by way of the service gateway APIs, and registering the event notification in a database.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for installing and managing point of interaction devices within a merchant environment.

As described above, existing methods for computer server event notifications in distributed computing systems may suffer from high computing resource costs, high maintenance costs, and lack of security. Thus, the embodiments of the present disclosure are directed to providing scalable and secure systems and methods for transmission of computer server event notifications.

One or more examples of these non-limiting embodiments are illustrated in the selected examples disclosed and described in detail with reference to FIGS. 1-16 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1:
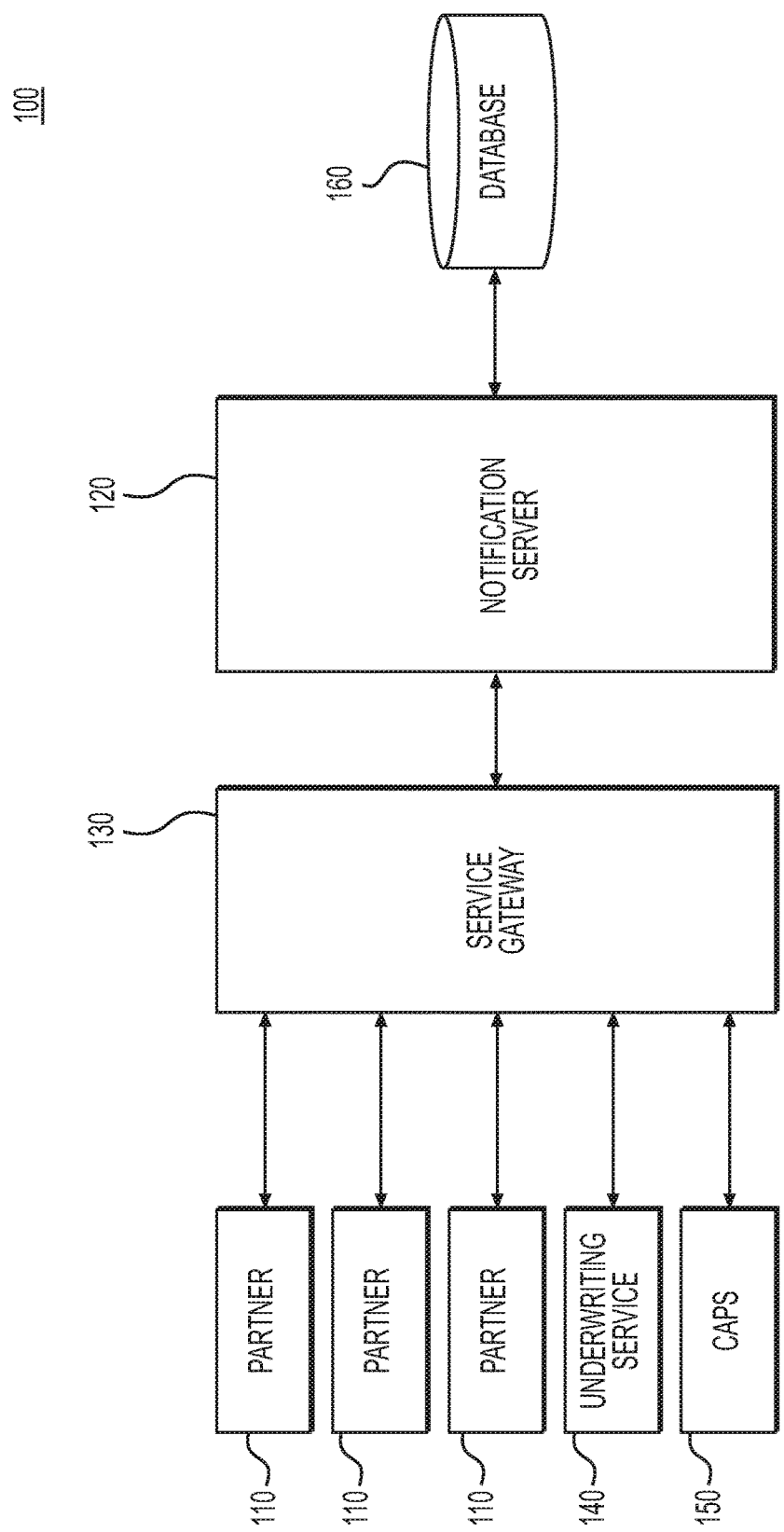
FIG. 1 depicts a block diagram of a system for secure transmission of computer server event notifications, according to one or more embodiments.

Turning to FIG. 1, in a distributed computing system, multiple computing systems may receive notifications of computer server events from other connected computing systems. For example, one or more partner computing systems 110 may receive computer server event notifications from a notification server 120. In addition to general computing systems, partner computing systems may include specialized computing systems. For example, in financial services systems, the partner computing systems, may include, for example, underwriting services systems 140 and contractual adjustment pricing systems (CAPS) 150, etc. Communication of the computer server event notification may be by way of a service gateway 130. Service gateway 130 may provide secure communication between notification server 120 and the partner computing systems 110, 140, 150. Interaction between service gateway 130 and the partner computing systems 110, 140, 150 may be according to specified APIs providing, for example, topic subscription, notification messaging, event publication by partner computing systems, and notification administration services, etc. These APIs will be discussed in further detail below. Notification server 120 may store information about, for example, partners, subscriptions, events, notifications, etc., in a database 160. Although database 160 is depicted as a single database, it is to be appreciated that multiple databases 160 may be employed. For example, separate databases and/or tables may be provided different types of events. Separation of databases and/or tables for an event type may facilitate auditing or compliance reporting for events of a certain type. Such separation may also improve performance of notification system by isolating high-frequency event types from low-frequency event types.

Figure 2:
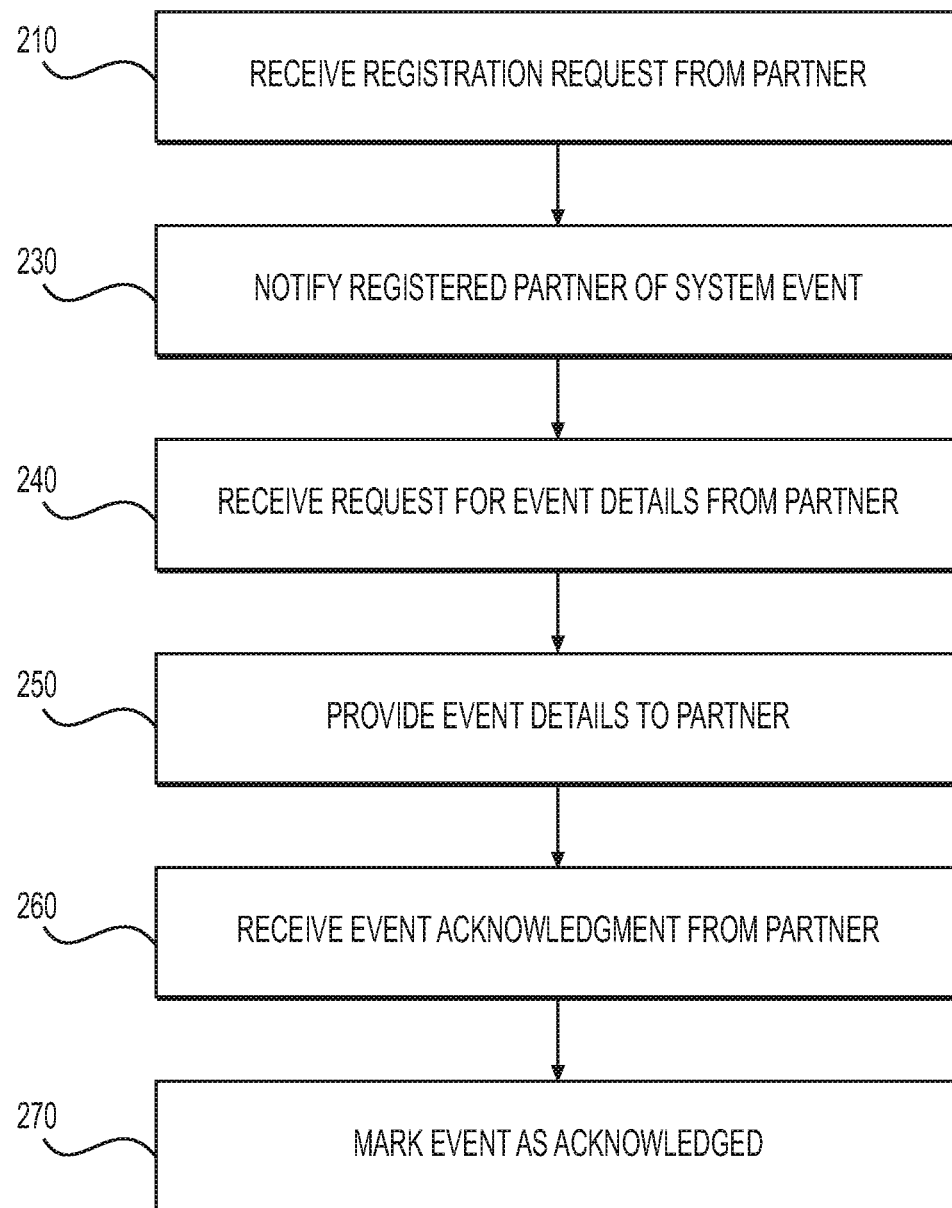
FIG. 2 is a flow chart depicting an example process for secure transmission of computer server event notifications, according to one or more embodiments.
Figure 3:
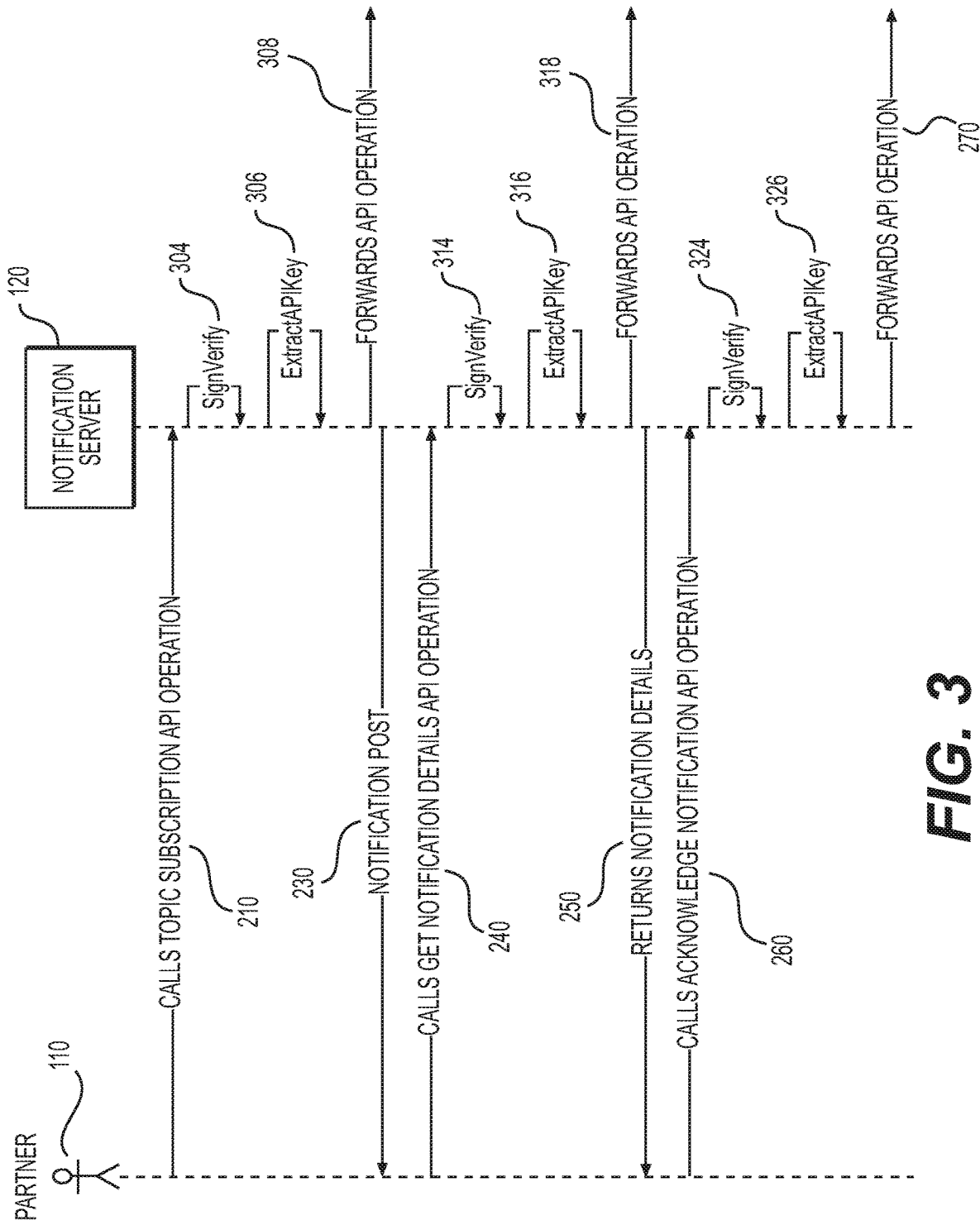
FIG. 3 depicts a process flow diagram of an example method for secure transmission of computer server event notifications, according to one or more embodiments.

FIG. 2 is a flow chart depicting an example process for secure transmission of computer server event notifications, according to one or more embodiments. FIG. 3 depicts a process flow diagram of an example method for secure transmission of computer server event notifications, according to one or more embodiments. As shown in FIGS. 2 and 3, a partner distributed computing system, such as partner computing system 110 depicted in FIG. 1, may communicate directly with a server, such as notification server 120 depicted in FIG. 1, without mediation by an additional gateway system, such as service gateway 130 depicted in FIG. 1. However, routing communications between the host system and the partners via the service gateway may reduce the number of rules that have to be in place for network pathways.

Figure 4:
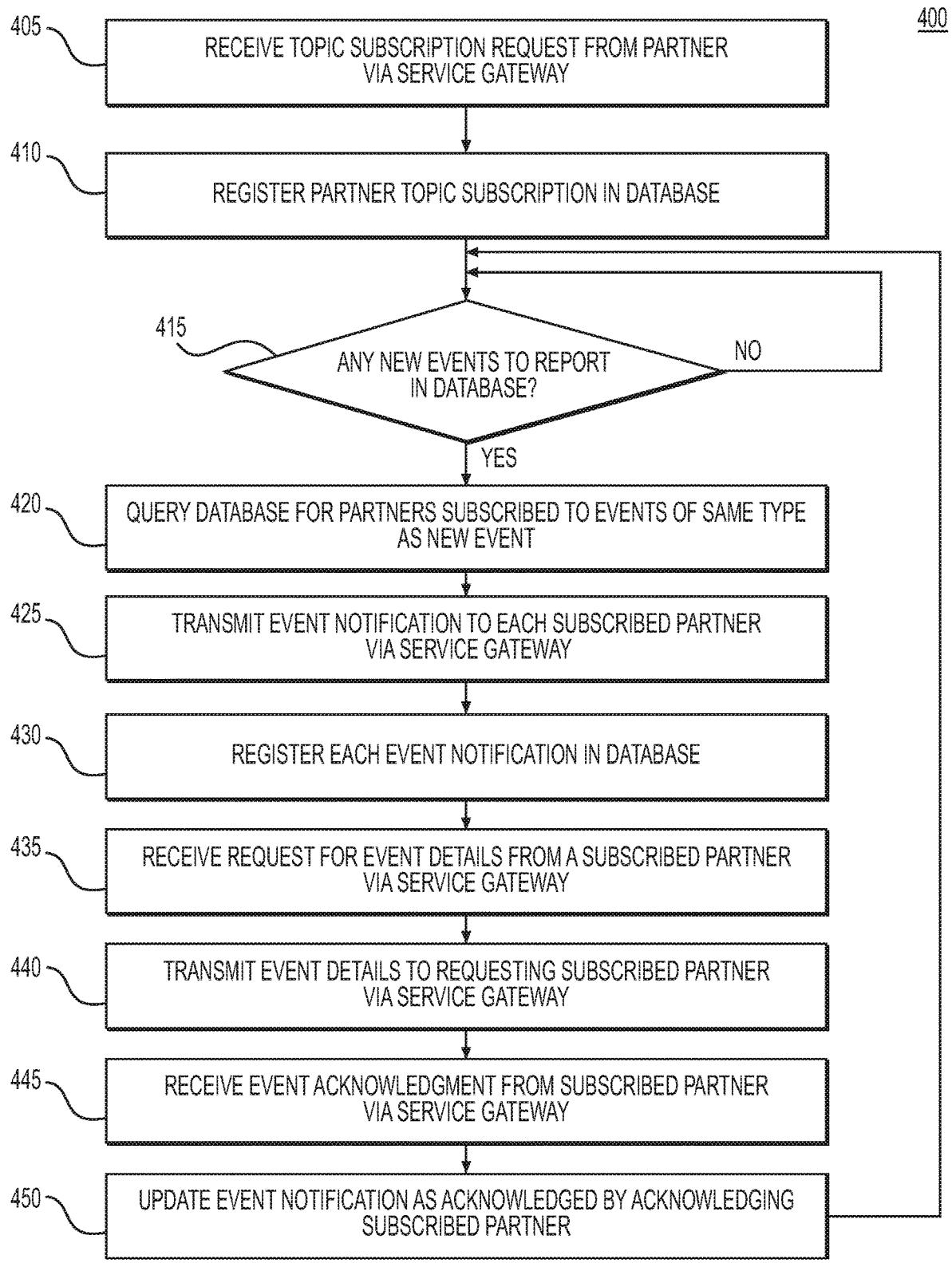
FIG. 4 is a flow chart depicting an example process for secure transmission of computer server event notifications, according to one or more embodiments.
Figure 5:
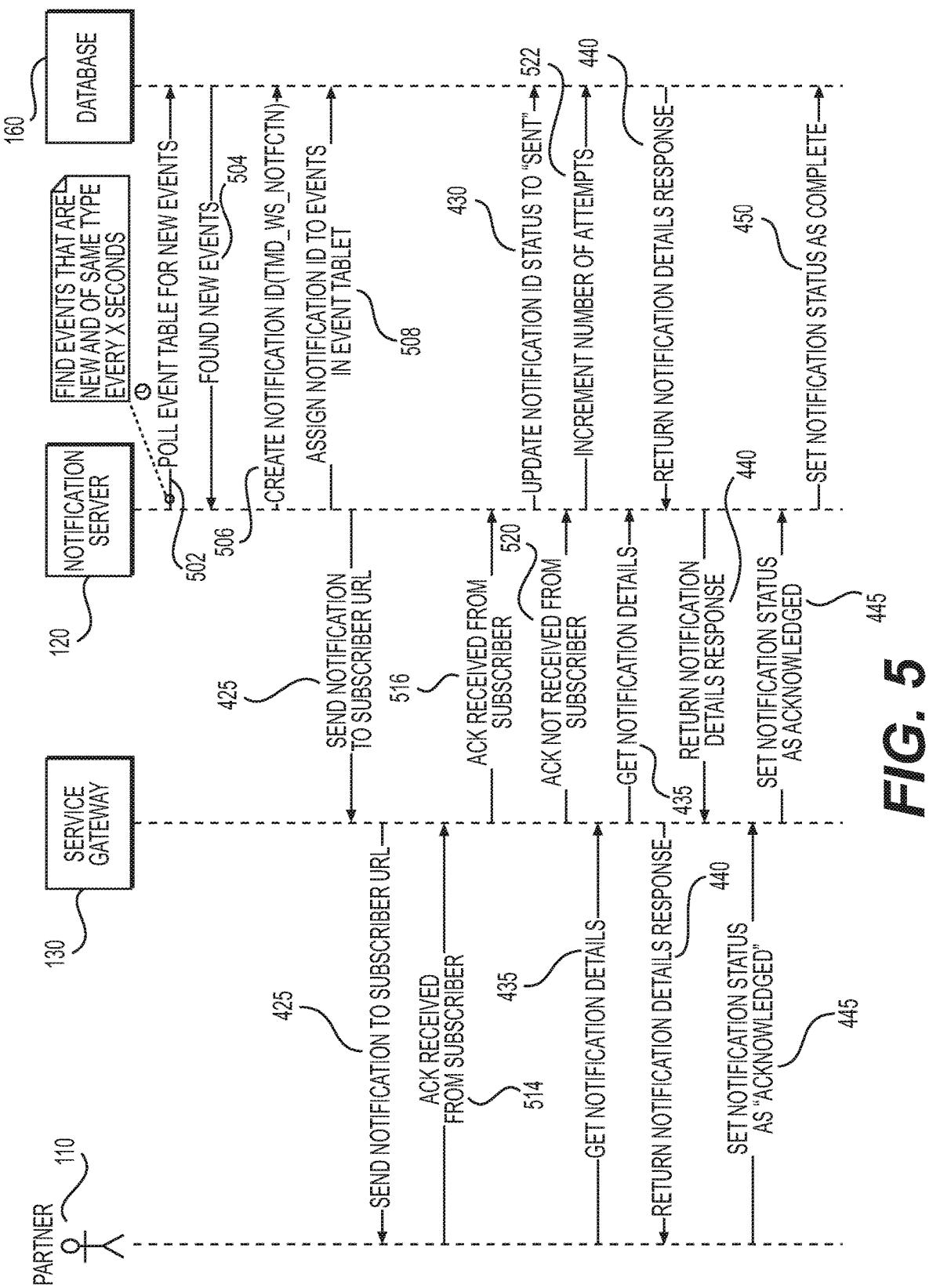
FIG. 5 depicts a process flow diagram of an example method for secure transmission of computer server event notifications, according to one or more embodiments.

As shown in FIGS. 2 and 3, in operation 210, a server, such as notification server 120 depicted in FIG. 1, may receive a the topic subscription registration request from a partner distributed computing system, such as partner computing system 110 depicted in FIG. 1. As shown in FIG. 3, the topic subscription registration request may include a license, and the server may verify a signature of the license (operation 304) and extract an API key from the license (operation 306). The server may then submit the registration request to an appropriate API within the server using the API key at operation 308. In operation 230, the server may send the registered partner distributed computing system a notification of events. In operation 240, the server may receive a request for notification details from the partner. As shown in FIG. 3, the notification details request may include a license, and the server may verify a signature of the license (operation 314) and extract an API key from the license (operation 316) to authenticate, authorize, and validate claims. The server may then submit the notification details request to an appropriate API within the server using the API key at operation 318. In operation 250, the server may provide notification details to a partner. In operation 260, the server may receive a notification acknowledgment from a partner. As shown in FIG. 3, the acknowledgement may include a license, and the server may verify a signature of the license (operation 324) and extract an API key from the license (operation 326). In operation 270, the server may mark the notification as acknowledged. As shown in FIG. 3, the notification may be marked as acknowledged through an appropriate API within the server using license assigned to subscriber with appropriate claims. Acknowledgement of the notification may help facilitate auditing and compliance of an enterprise. Acknowledgement of the notification may also provides the partner sufficient time to process the notification FIG. 4 is a flow chart depicting an example process for secure transmission of computer server event notifications, according to one or more embodiments. FIG. 5 depicts a process flow diagram of an example method for secure transmission of computer server event notifications, according to one or more embodiments. As shown in FIGS. 4 and 5, communication between the server, such as notification server 120 depicted in FIG. 1, and a partner distributed computing system, such as partner computing system 110 depicted in FIG. 1, may be mediated by a service gateway, such as the service gateway 130 depicted in FIG. 1. The service gateway may provide additional advantages, such as, for example, security for transmitted notifications, acknowledgements, etc., or abstraction for APIs published by the notification server, the partner systems, or other components within a distributed computing system. That is, the service gateway may publish an API that is equivalent to an API published by the notification server. The partner system, thus, may interface to the service gateway API, as opposed to the notification server API. Interfacing with the service gateway API may allow the notification server API to be modified without disturbing the implementation of the partner system. Similar API abstractions may be published for APIs published by partner systems, such as, for example, partners 110, underwriting service 140 or contractual adjustment pricing system (CAPS) 150 depicted in FIG. 1. Security protocols provided by the service gateway and notification server may include, for example, message authentication codes (MAC), JavaScript Object Notation (JSON) Web Tokens (JWT), or secure Hypertext Transfer Protocol Secure (HTTPS), etc. Additional security aspects of the service gateway will be discussed in greater detail below with respect to FIGS. 13-16.

Such secure transmission of computer server event notifications, may provide benefits for partners. For example, topic notification to partners can be turned off temporarily or permanently depending on business requirements over time.

As shown in FIGS. 4 and 5, in operation 405, a server, such as notification server 120 depicted in FIG. 1, may receive a subscription request from a partner distributed computing system, such as partner computing system 110 depicted in FIG. 1, the service gateway may validate if subscribing partner is authorized to receive notification of requested event type and in operation 410, the server may register the partner topic subscription in a database, such as database 160 depicted in FIG. 1. The registration request from the partner distributed computing system may be submitted by way of a service gateway, such as the service gateway 130 depicted in FIG. 1. In operation 415, the server may wait for an event to report from the database 160. For example, as shown in FIG. 5, in operation 502, notification server 120 may periodically poll database 160 for new events. If one or more new events are found, database 160 may return them to notification server 120 in operation 504. Notification server 120 may then, in operation 506, create a notification ID for the new event and store the notification ID in database 160. In operation 420, the server may query the database for partners subscribed to events of the same type as the new event. Notification server 120 may assign a notification identification to events. In operation 425, the server may transmit an event notification to each subscribed partner. The event notification may be transmitted via a service gateway, such as the service gateway 130 depicted in FIG. 1. As shown in FIG. 5, the partner may send receipt of the event notification in operation 514. The receipt may be sent via a service gateway in operation 516. Upon receiving the receipt from the partner, the server may mark the notification in the database as sent in operation 430. For example, the event notification may be registered with a status of "sent," as shown in FIG. 5. If a receipt is not received from the partner, as in operation 520, the server may increment a counter of the number of attempts to deliver the notification to the partner in operation 522. The number of attempts to deliver the notification may be configured in the database for each topic subscription. This may be used for later reporting or auditing of the notification server. If the number of attempts to deliver the notification exceeds a predetermined threshold, then the server may determine that the notification has permanently failed. The server may further attempt to inform the affected partner system of the failure. This may be done, for example, by accessing an API published by the partner system or by transmitting a message to an administrator of the affected partner system or by providing APIs by host system to give details of notifications that failed. The server may hold subsequent notifications until the affected partner can be verified as available to receive notifications. Alternatively, the server may proceed with subsequent notifications and attempt to re-send the failed notification upon the successful completion of a subsequent notification. In operation 435, the server may receive a request for notification details from the subscribed partner via the service gateway, and in operation 440, the server may transmit notification details to requesting subscribed partner. The notification details may be transmitted to the partner via the service gateway. In operation 445, the server may receive an acknowledgment of the event report from subscribed partner via the service gateway. Finally, in operation 450, the server may update the event notification status to reflect the acknowledgment by the partner. For example, as shown in FIG. 5, the server may set the notification status as "complete."

Figure 6:
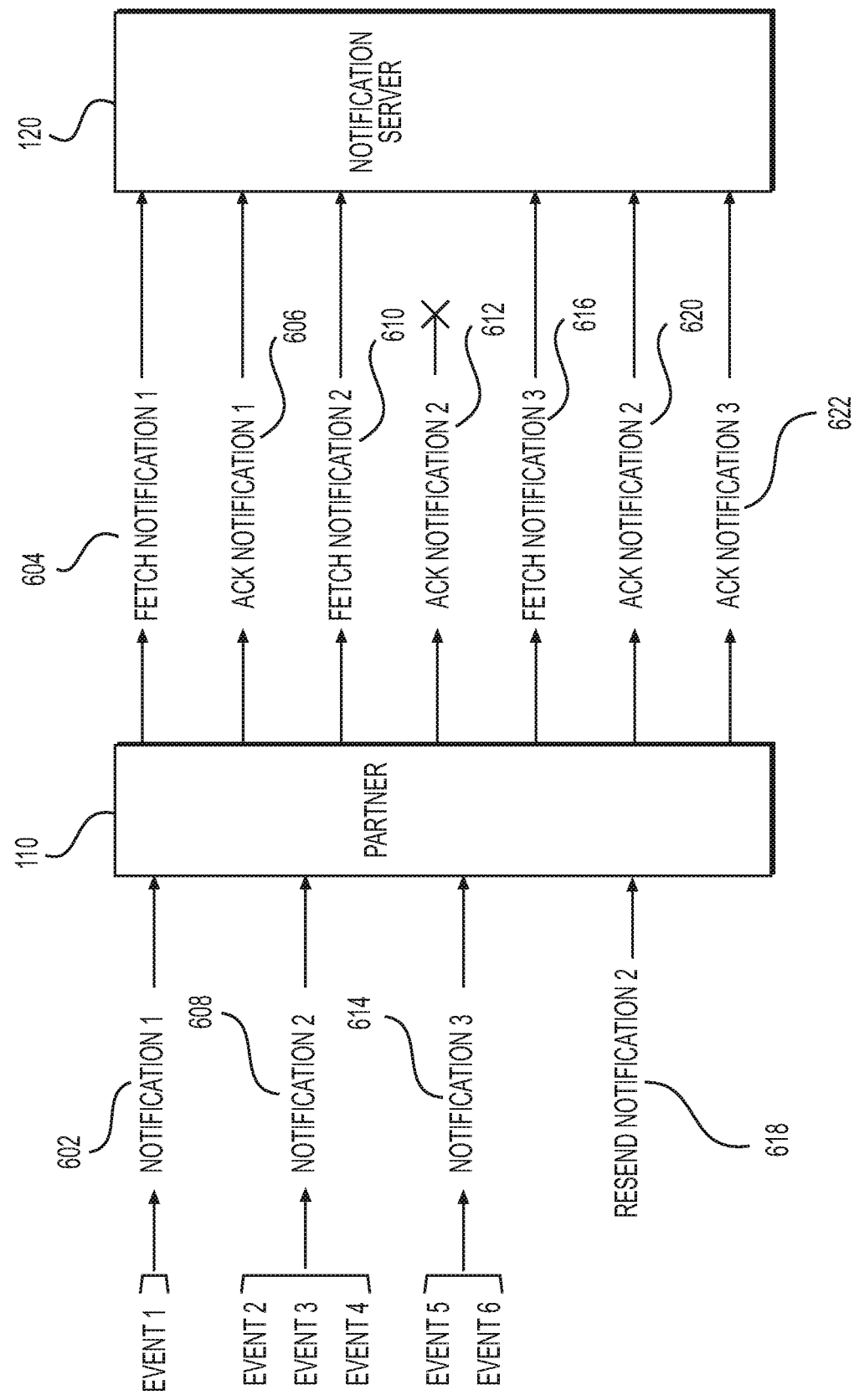
FIG. 6 depicts a block diagram of computer server event reporting sequences in secure transmission of computer server event notifications, according to one or more embodiments.
Figure 7:
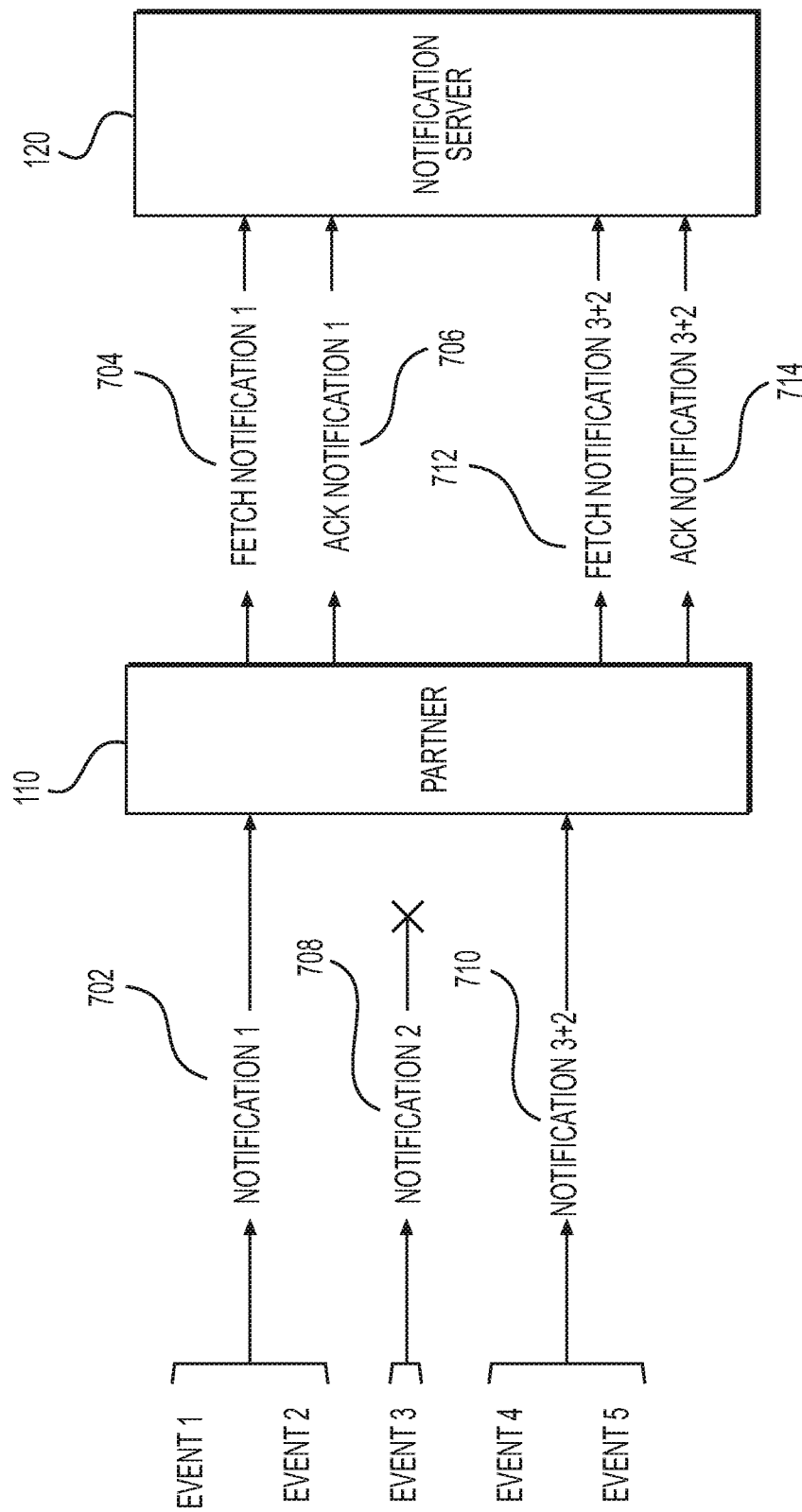
FIG. 7 depicts a block diagram of computer server event reporting sequences in secure transmission of computer server event notifications, according to one or more embodiments.

FIGS. 6 and 7 depict block diagrams of computer server event reporting sequences in secure transmission of computer server event notifications, according to one or more embodiments.

As shown in FIGS. 6 and 7, a server, such as notification server 120 depicted in FIG. 1 may transmit multiple events with each notification to a partner, such as partner 110 depicted in FIG. 1. Grouping multiple events in a notification may reduce chattiness between the partners and the host system. The number of events grouped within each notification may be determined, for example, according to event type, partner preference settings, or notification server settings. In one or more embodiments, the number of events to be grouped in a notification may be based on sending a notification when a predetermined number of events have been received for notification. For example, a notification may be sent when five events have been received for a given event type. However, the number of events may be determined separately for each event type and for each partner. Further, the number of events may be determined differently depending on a time of day or day of the week. For example, a smaller or larger number of events may be reported in periods of low activity, such as overnight. In one or more embodiments, the number of events to be transmitted in a notification may be based on sending a notification per each predetermined period of time. For example, a notification may be sent every five minutes when at least one event has been received for notification. However, the length of the period of time may be determined separately for each event type and for each partner. Further, the length of the period of time may be determined differently depending on a time of day or day of the week. For example, a shorter or longer period of time may be used in periods of low activity, such as overnight. In addition, a predetermined maximum threshold may be set for the number of events transmitted in a single notification. If a maximum threshold is reached before a notification is to be transmitted based on a time period, then the notification may be transmitted early. For example, if a time period is set for five minutes and a threshold is set at 1,000 events, a notification may be transmitted early if, for example, 1,001 events are received for reporting within three minutes of the five-minute period. Once a notification has been transmitted, the period of time may be restarted or a next notification may be transmitted at the end of the original time period.

For example, as shown in FIG. 6, Events 1-6 may be transmitted to the partner in three notifications. For example, in operation 602, Event 1 may be transmitted to the partner in Notification 1 by operation 602, Events 2-4 may be transmitted to the partner in Notification 2 by operation 608, and Events 5 and 6 may be transmitted to the partner in Notification 3 by operation 614. As shown in FIG. 6, each notification received by the partner may, in turn, be fetched and acknowledged by the partner. For example, Notification 1 may be fetched by the partner in operation 604 and acknowledged by the partner in operation 606. Notification 2 may be fetched by the partner in operation 610 and acknowledged by the partner in operation 612. Notification 3 may be fetched by the partner in operation 616 and acknowledged by the partner in operation 622. However, an acknowledgment of a notification from the partner may not be received by the server. In this case, the server may attempt to resend the unacknowledged notification. For example, as shown in FIG. 6, if the acknowledgment of Notification 2 is not received, then the server may resend Notification 2 to the partner in operation 618. The partner may then acknowledge Notification 2 in operation 620.

Alternatively, if transmission of a notification to a partner fails, then the server may detect a failure of the partner to acknowledge the notification and may resend the notification. For example, as shown in FIG. 7, if the transmission of Notification 2 in operation 708 fails to be delivered to the partner, then the server may resend Notification 2 combined with Notification 3 in operation 710. The partner may then fetch the combined Notifications 3 and 2 at operation 712 and acknowledge the combined Notifications 3 and 2 at operation 714.

Figure 8:
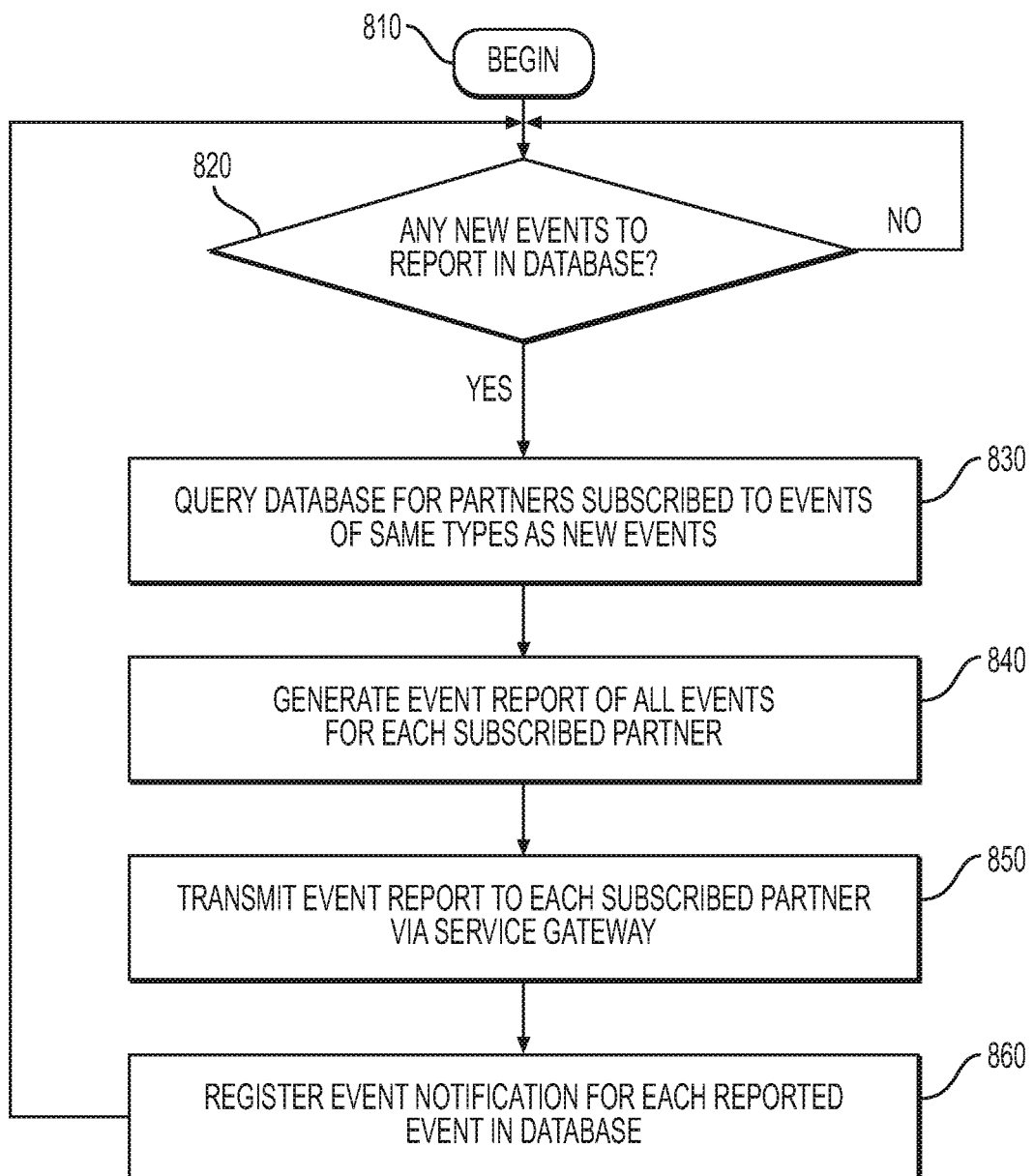
FIG. 8 is a flow chart depicting an example process for secure transmission of computer server event notifications, according to one or more embodiments.

FIG. 8 is a flow chart depicting an example process for secure transmission of computer server event notifications, according to one or more embodiments. In operation 820, a server, such as notification server 120 depicted in FIG. 1, may determine if there one or more new events to report in a database, such as database 160 depicted in FIG. 1. If there are none, then the server may wait for a predetermined period of time before repeating the determination. The predetermined period of time may vary based on the type of event or other settings for the server. For example, the predetermined time period may be shorter for event types that occur frequently or may be longer for event types that occur infrequently. The predetermined period of time may also vary based on the time of day or the day of the week, etc. For example, the predetermined time period may be shorter at times that events occur more frequently or may be longer at times that events occur less frequently. If there are one or more new events to be reported, then in operation 830 the server may query the database for one or more partners, such as partners 110 depicted in FIG. 1, subscribed to events of same types as new events. In operation 840, the server may generate, for each subscribed partner, an event report of all events for the subscribed partner, and in operation 850, the server may transmit each event report to the subscribed partner. The event report may be transmitted via service gateway, such as service gateway 130. In operation 860, the server may register the event notification for each reported event in the database.

The process of reporting event notifications from a server to a partner may vary depending on the type of event notification to be reported. For example, events may be related to fraud alerts, underwriting events, risk monitoring, or payment refunds, etc. FIGS. 9-12 depict example processes for transmitting different types of event notifications.

Figure 9:
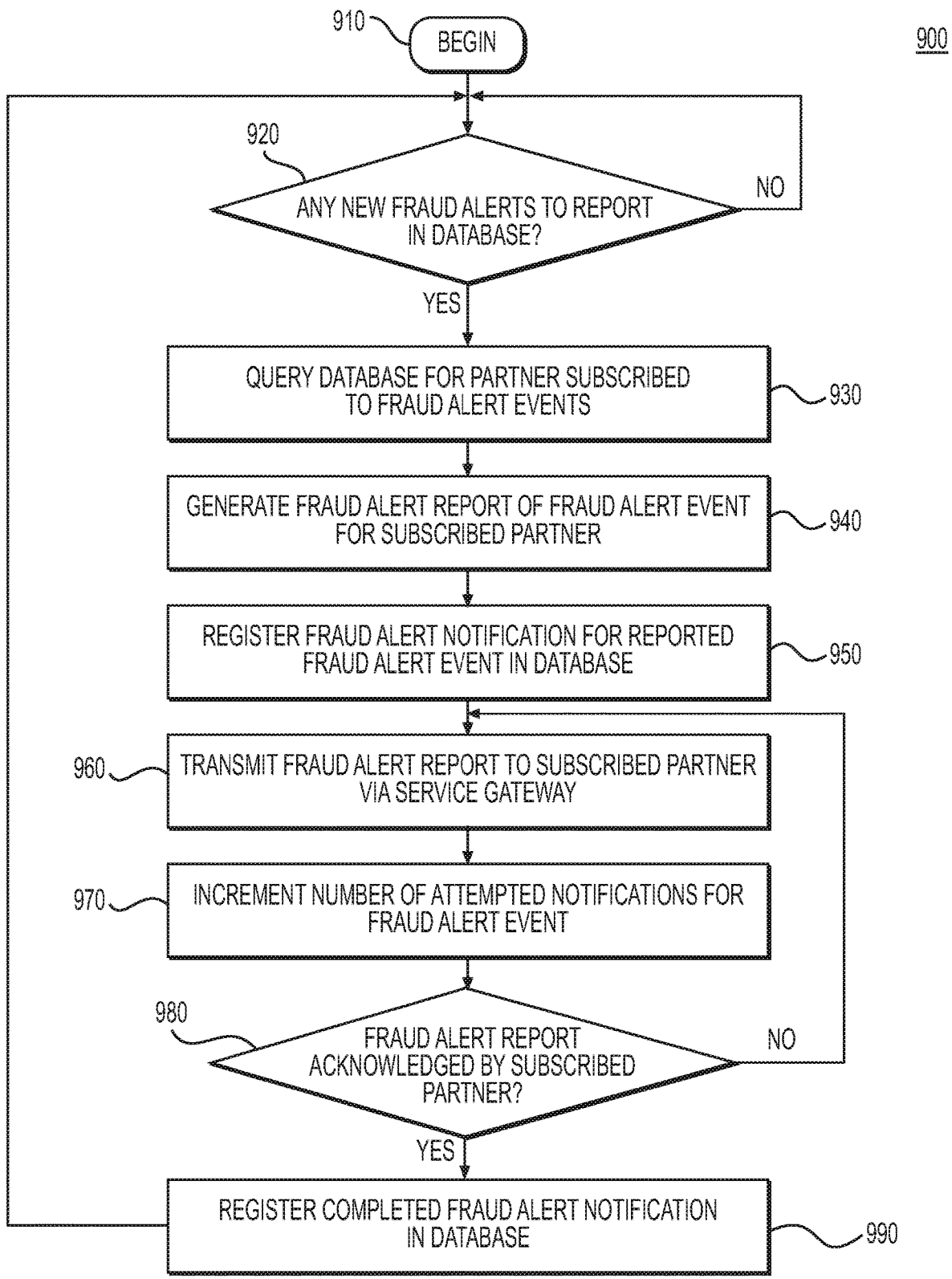
FIG. 9 is a flow chart depicting an example process for secure transmission of fraud alert notifications, according to one or more embodiments.

FIG. 9 is a flow chart depicting an example process for secure transmission of fraud alert notifications, according to one or more embodiments. In operation 920, a server, such as notification server 120 depicted in FIG. 1, may determine if one or more new fraud alert events to report are stored in a database, such as database 160 depicted in FIG. 1. If no fraud alert events are stored in the database, then the server may wait for a predetermined period of time before repeating the determination. If fraud alert events to report are stored in the database, then in operation 930 the server may query the database for one or more partners, such as partners 110 depicted in FIG. 1, subscribed to events related to fraud alerts. In operation 940, the server may generate, for each subscribed partner, notification related to fraud alerts for the subscribed partner, and in operation 960, the server may transmit notification to the subscribed partner. The event notification may be transmitted via service gateway, such as service gateway 130. In operation 950, the server may register the notification for events related to a specific type of fraud alerts in the database. For some event types, including events related to fraud alerts, the server may track the notification and acknowledgement of the reported events. Accordingly, in operation 970, following the reporting of an event related to fraud alerts, the server may increment a number of attempted notifications for the fraud alert events. If receipt of the notification related to fraud alerts is not received at operation 980, then the server may return to operation 960 to re-transmit the unacknowledged event report related to fraud alerts to the subscribed partner. Otherwise, if the reporting of an event related to fraud alerts is acknowledged at operation 980, then at operation 990, the server may register the event report related to fraud alerts as completed in the database.

Figure 10:
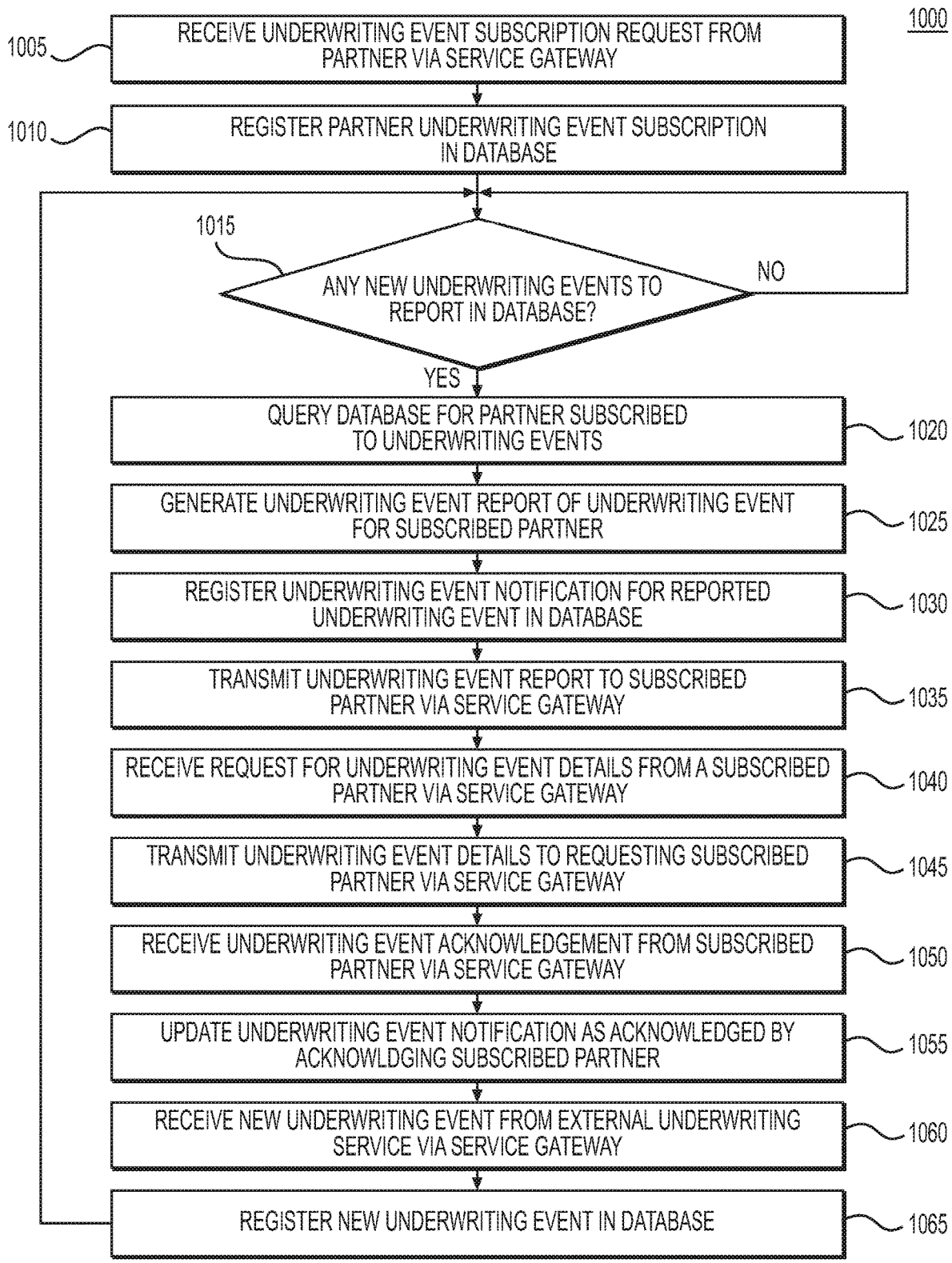
FIG. 10 is a flow chart depicting an example process for secure transmission of underwriting notifications, according to one or more embodiments.

In addition to events stored in a database, such as database 160 depicted in FIG. 1, events may be published by an internal system such as, for example, an underwriting service 140 or a contractual adjustment pricing system (CAPS) 150 depicted in FIG. 1. For example, underwriting service 140 may publish events related to underwriting events or risk monitoring events, etc. FIG. 10 is a flow chart depicting an example process for secure transmission of underwriting notifications, according to one or more embodiments. In operation 1005, a server, such as notification server 120 depicted in FIG. 1, may receive a registration request from a partner distributed computing system, such as partner computing system 110 depicted in FIG. 1, and in operation 1010, the server may register the partner topic subscription in a database, such as database 160 depicted in FIG. 1. The registration request from the partner distributed computing system may be submitted by way of a service gateway, such as the service gateway 130 depicted in FIG. 1. In operation 1015, the server may determine if one or more new underwriting events to report are stored in a database, such as database 160 depicted in FIG. 1. If no underwriting events are stored in the database, then the server may wait for a predetermined period of time before repeating the determination. If underwriting events to report are stored in the database, then in operation 1020 the server may query the database for one or more partners, such as partners 110 depicted in FIG. 1, subscribed to underwriting events. In operation 1025, the server may generate, for each subscribed partner, a notification identification of all underwriting events for the subscribed partner, and in operation 1035, the server may transmit each underwriting notification identification to the subscribed partner. The notification identification may be transmitted via service gateway, such as service gateway 130. In operation 1030, the server may create the event notification in the database. In operation 1040, the server may receive a request for notification details from the subscribed partner via the service gateway, and in operation 1045, the server may transmit notification details to requesting subscribed partner. The notification details may be transmitted to the partner via the service gateway. In operation 1050, the server may receive an acknowledgment of the notification report from subscribed partner via the service gateway. In operation 1055, the server may update the notification status to reflect the acknowledgment by the partner. In operation 1060, the server may receive underwriting events from an external underwriting service, such as underwriting service 140 depicted in FIG. 1. The event details may be transmitted to the partner via the service gateway. In operation 1065, the server may create the new underwriting event in the database.

Figure 11:
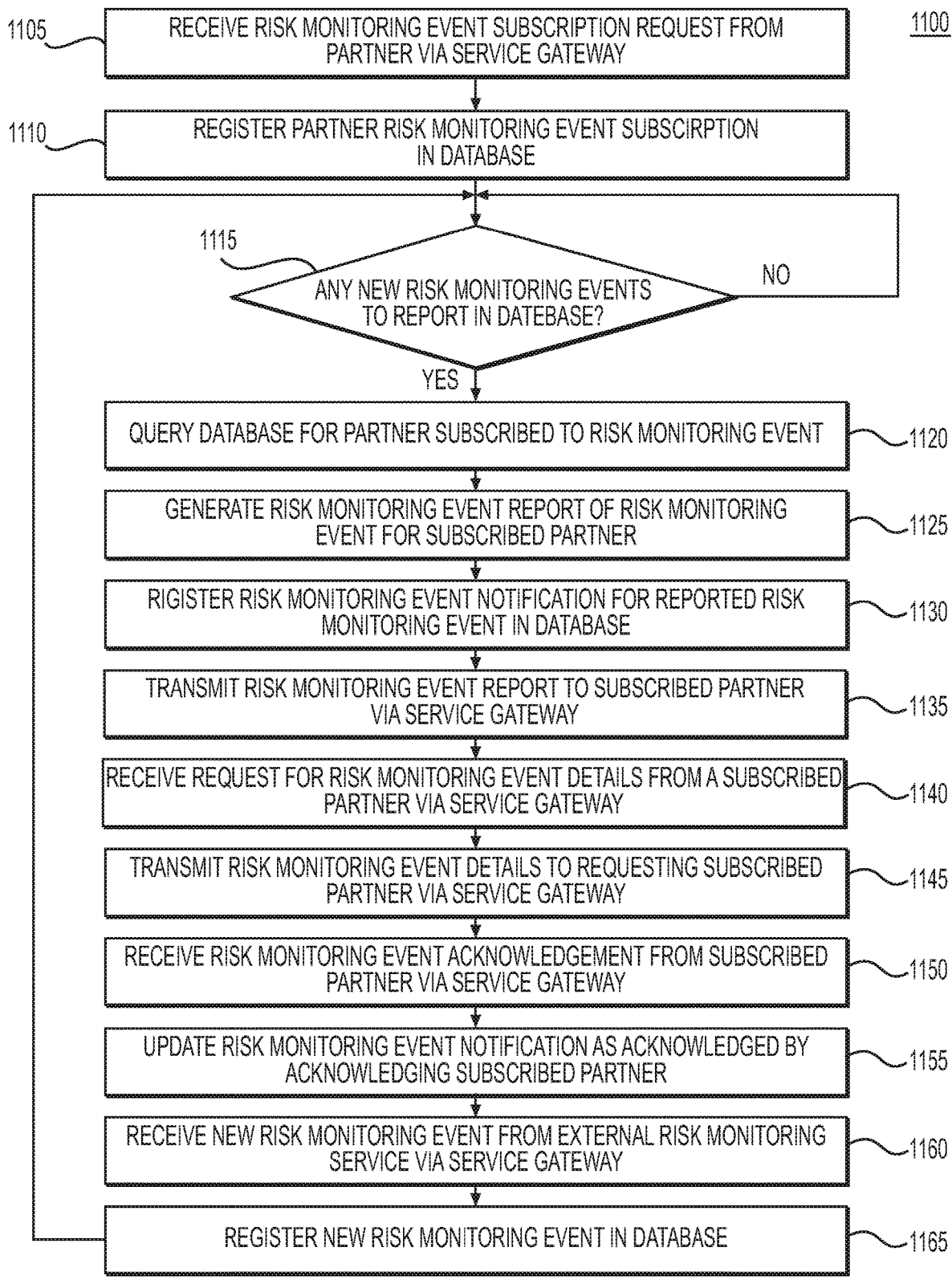
FIG. 11 is a flow chart depicting an example process for secure transmission of risk monitoring notifications, according to one or more embodiments.

FIG. 11 is a flow chart depicting an example process for secure transmission of risk monitoring notifications, according to one or more embodiments. In operation 1105, a server, such as notification server 120 depicted in FIG. 1, may receive a topic subscription request from a partner distributed computing system, such as partner computing system 110 depicted in FIG. 1, and in operation 1110, the server may register the partner topic subscription in a database, such as database 160 depicted in FIG. 1. The registration request from the partner distributed computing system may be submitted by way of a service gateway, such as the service gateway 130 depicted in FIG. 1. In operation 1115, the server may determine if one or more new events related to risk monitoring to report are stored in a database, such as database 160 depicted in FIG. 1. If no events related to risk monitoring are stored in the database, then the server may wait for a predetermined period of time before repeating the determination. If events related to risk monitoring to report are stored in the database, then in operation 1120 the server may query the database for one or more partners, such as partners 110 depicted in FIG. 1, subscribed to events related to risk monitoring In operation 1125, the server may generate, for each subscribed partner, an event report of all events related to risk monitoring for the subscribed partner, and in operation 1135, the server may transmit notification related to risk monitoring to the subscribed partner. The event notification may be transmitted via service gateway, such as service gateway 130. In operation 1130, the server may register the event notification for each reported event related to risk monitoring in the database. In operation 1140, the server may receive a request for notification details from the subscribed partner via the service gateway, and in operation 1145, the server may transmit notification details to requesting subscribed partner. The notification details may be transmitted to the partner via the service gateway. In operation 1150, the server may receive an acknowledgment of the notification from subscribed partner via the service gateway. In operation 1155, the server may update the event notification status to reflect the acknowledgment by the partner. In operation 1160, the server may receive a request to create a new risk monitoring event from an internal system, such as underwriting service 140 depicted in FIG. 1. The event details may be transmitted to the partner via the service gateway. In operation 1165, the server may register the new risk monitoring event in the database. An event identification number for registered event may be transmitted to partner via service gateway.

Figure 12:
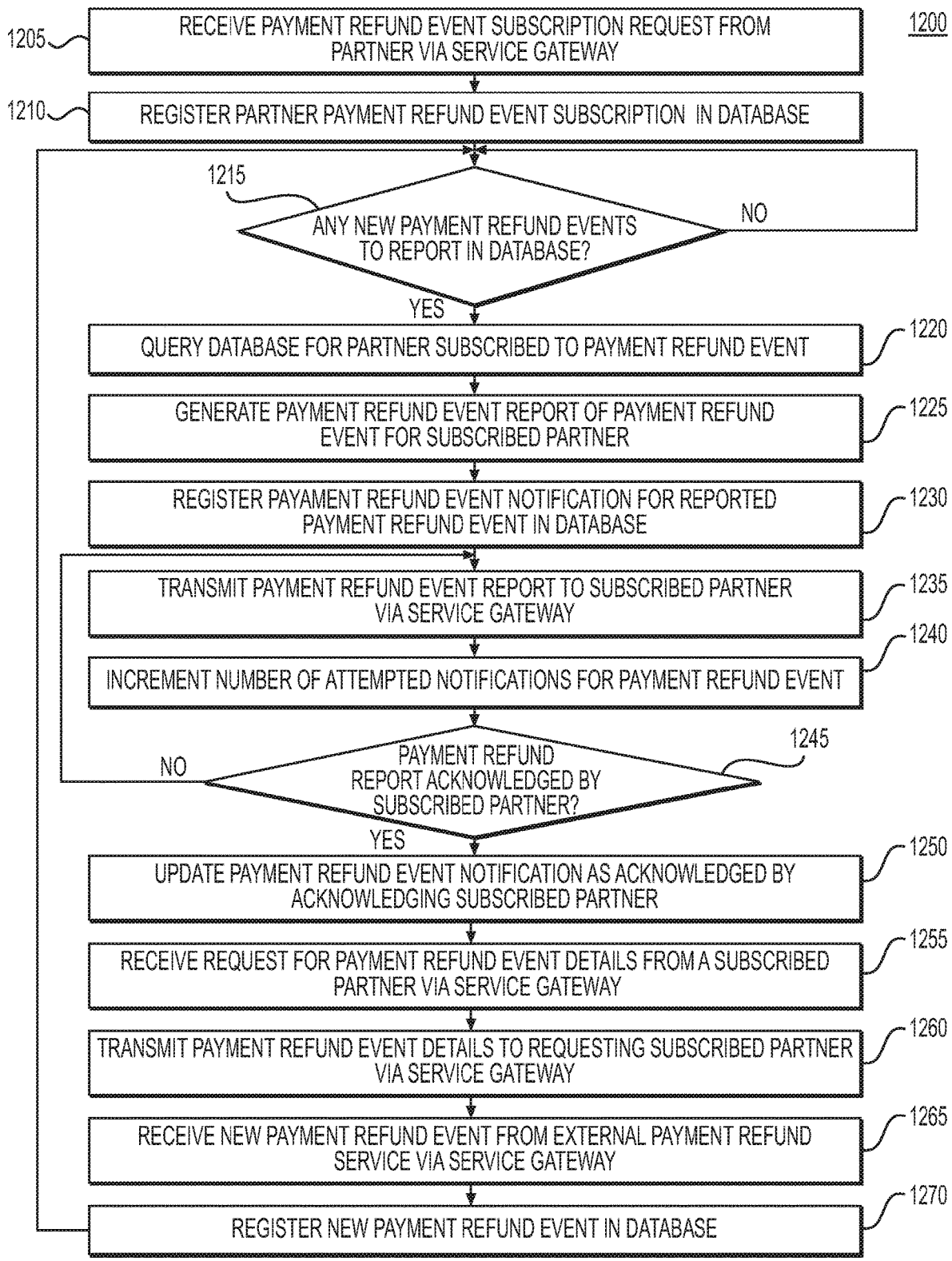
FIG. 12 is a flow chart depicting an example process for secure transmission of payment refund notifications, according to one or more embodiments.

For some event types, such as, for example, payment refund events published by an external service, a server, such as notification server 120 depicted in FIG. 1, may wish track the reporting and acknowledgement of the reported events. FIG. 12 is a flow chart depicting an example process for secure transmission of payment refund notifications, according to one or more embodiments. In operation 1205, a server, such as notification server 120 depicted in FIG. 1, may receive a registration request from a partner distributed computing system, such as partner computing system 110 depicted in FIG. 1, and in operation 1210, the server may register the partner topic subscription in a database, such as database 160 depicted in FIG. 1. The registration request from the partner distributed computing system may be submitted by way of a service gateway, such as the service gateway 130 depicted in FIG. 1. In operation 1215, the server may determine if one or more new events related to payment refund to report are stored in a database, such as database 160 depicted in FIG. 1. If no events related to payment refund are stored in the database, then the server may wait for a predetermined period of time before repeating the determination. If events related to payment refund to report are stored in the database, then in operation 1220 the server may query the database for one or more partners, such as partners 110 depicted in FIG. 1, subscribed to events related to payment refund In operation 1225, the server may generate, for each subscribed partner, an event report of all events related to payment refund for the subscribed partner, and in operation 1235, the server may transmit each event report related to payment refund to the subscribed partner. The event report may be transmitted via service gateway, such as service gateway 130. In operation 1230, the server may register the event notification for each reported event related to payment refund in the database. For some event types, including events related to payment refund, the server may track the reporting and acknowledgement of the reported events. Accordingly, in operation 1240, following the reporting of an event related to payment refund, the server may increment a number of attempted notifications for the payment refund event. If the reporting of an event related to payment refund is not acknowledged at operation 1245, then the server may return to operation 1235 to re-transmit the unacknowledged event report related to payment refund to the subscribed partner. Otherwise, if the reporting of an event related to payment refund is acknowledged at operation 1245, then at operation 12500 the server may register the event report related to payment refund as completed in the database. In operation 1255, the server may receive a request for event details from the subscribed partner via the service gateway, and in operation 1260, the server may transmit event details to requesting subscribed partner. The event details may be transmitted to the partner via the service gateway. In operation 1265, the server may receive new payment refund event from an external refund system, such as the contractual adjustment payment system (CAPS) 150 depicted in FIG. 1. The event details may be transmitted to the partner via the service gateway. In operation 1270, the server may register the new payment refund event in the database.

Figure 13:
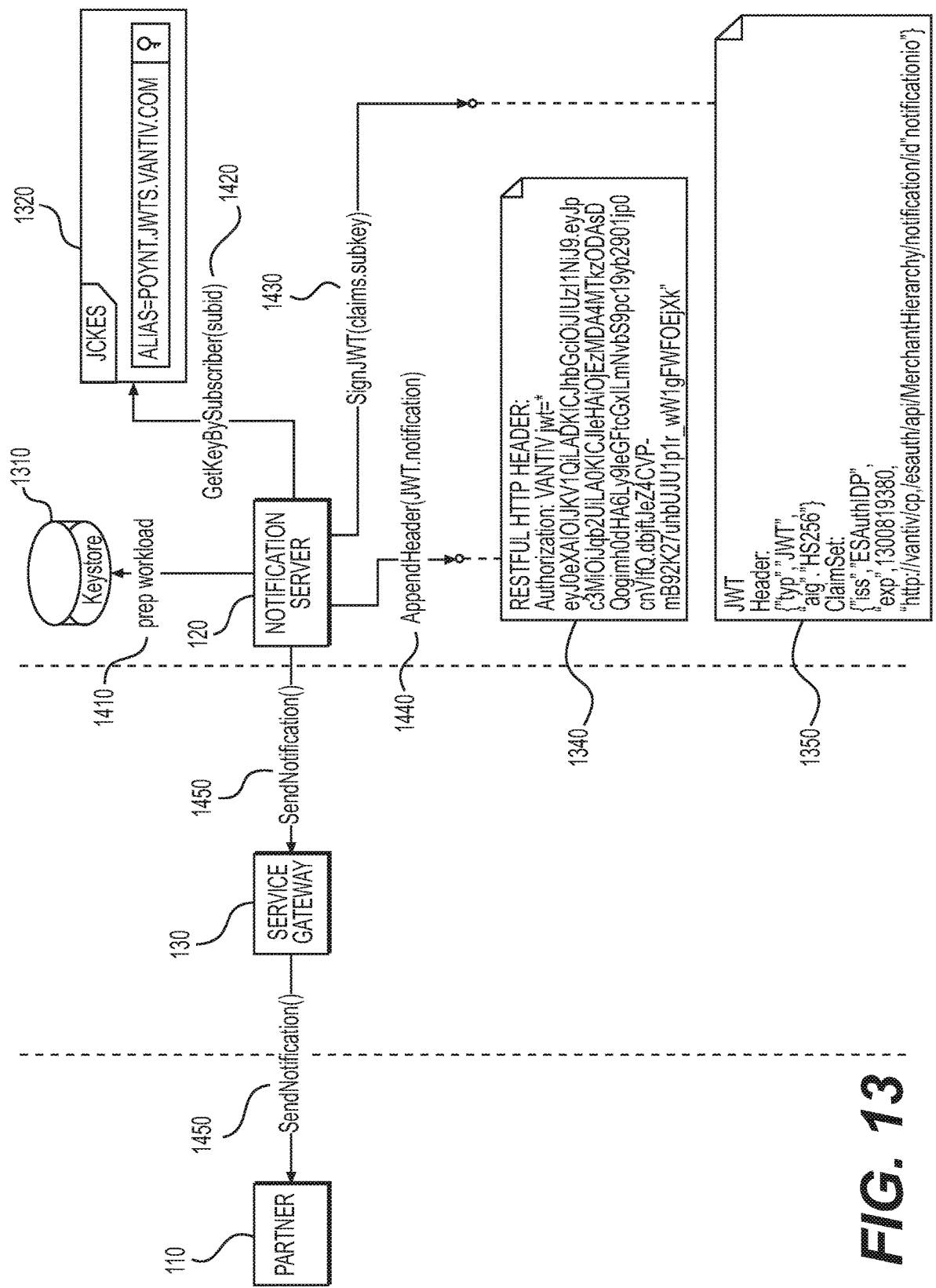
FIG. 13 depicts a process flow diagram of an example method for secured information exchange of computer server event notifications between notification server and subscribing partner, according to one or more embodiments.
Figure 14:
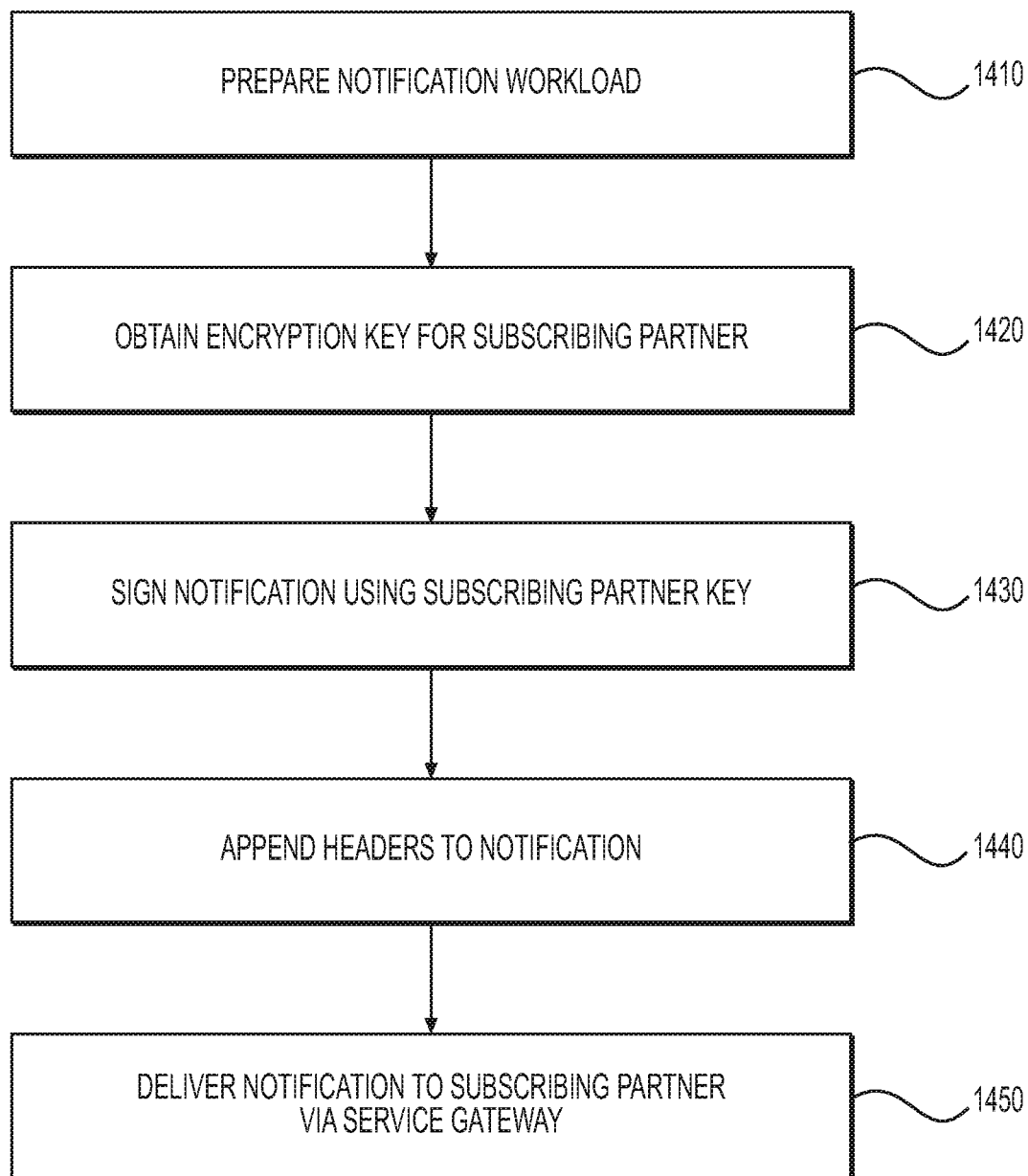
FIG. 14 is a flow chart depicting an example process for building a signed notification payload that will be exchanged between notification server and subscribing partner.

FIGS. 13 and 14 depict a process flow diagram and a flow chart, respectively, of an example method for secure transmission of computer server event notifications, according to one or more embodiments. In operation 1410, the server may prepare a notification workload including accessing encryption/decryption key information from a database, such as key store 1310 depicted in FIG. 13. In operation 1420, the server may obtain an encryption key for a subscribing partner, such as partner 110 depicted in FIG. 1, from a database, such as database 1320 depicted in FIG. 13. In operation 1430, the server may sign the notification using a subscribing partner key. For example, the server may sign the notification using a JSON Web Token (JWT) such as JWT 1350 depicted in FIG. 13 and the subscribing partner encryption key obtained in operation 1420. However, other means for securely signing the notification may be employed. In operation 1440, the server may append headers to the signed notification. For example, a header such as the HTTP header 1340 depicted in FIG. 13 may be appended to the signed notification. However, other types of headers may be appended to the notification. In operation 1450, the server may deliver the notification to the subscribing partner via a service gateway, such as service gateway 130 depicted in FIG. 1.

Figure 15:
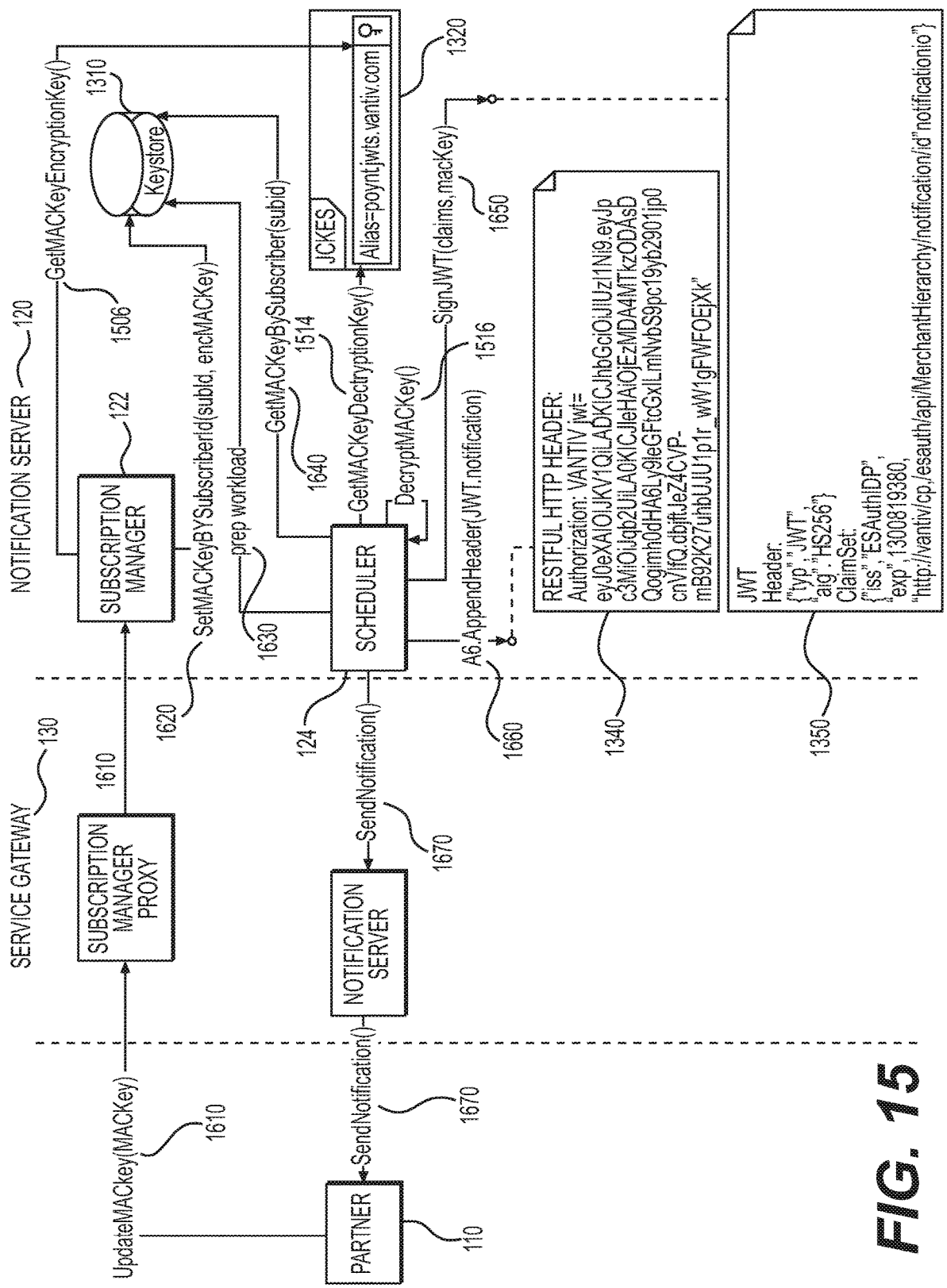
FIG. 15 depicts a process flow diagram of an example method for secure transmission of computer server event notifications, according to one or more embodiments.
Figure 16:
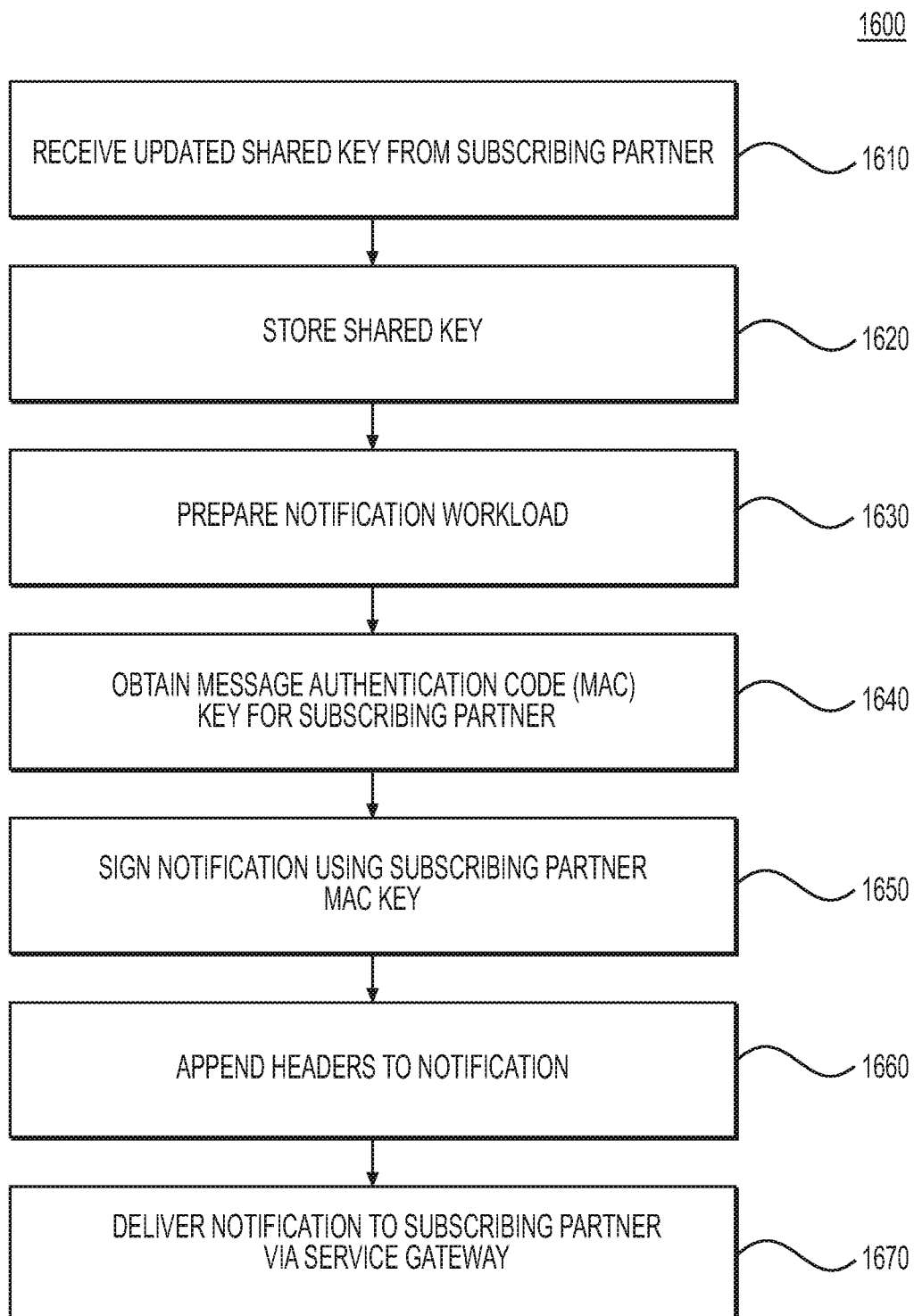
FIG. 16 is a flow chart depicting an example process for secure transmission of computer server event notifications, according to one or more embodiments.

FIGS. 15 and 16 depict a process flow diagram and a flow chart, respectively, of an example method for authentication in a system for secure transmission of computer server event notifications, according to one or more embodiments.

In operation 1610, the server may receive an updated shared key from the subscribing partner, and in operation 1620, the server may store the received shared key in a database in an encrypted form, such as key-store 1310 depicted in FIG. 15. A key stored in system key store is used encrypt shared key received. Operations 1610 and 1620 may be performed by a subscription manager within the server, such as subscription manager 122 depicted in FIG. 15. In operation 1630, the server may prepare a notification payload including accessing encryption/decryption key information from the database. In operation 1640, the server may obtain MAC key for subscribing partner. In order to employ the obtained partner MAC key, the server may obtain a MAC key decryption key from the database in operation 1514, and may decrypt the partner MAC key using the obtained MAC key decryption key in operation 1516. In operation 1650, the server may sign the notification using the subscribing partner MAC key. For example, the server may sign the notification using a JSON Web Token (JWT), such as JWT 1350 depicted in FIG. 15 and the subscribing partner MAC key obtained in operation 1610. However, other means for securely signing the notification may be employed. In operation 1660, the server may append headers to the signed notification. For example, a header such as the HTTP header 1340 depicted in FIG. 15 may be appended to the signed notification. However, other types of headers may be appended to the notification. In operation 1670, the server may deliver the notification to the subscribing partner via a service gateway, such as service gateway 130 depicted in FIG. 1. The preparation, signing, and transmission of the notification may be performed by a scheduler within the server, such as the scheduler 124 depicted in FIG. 15.

Figure 17:
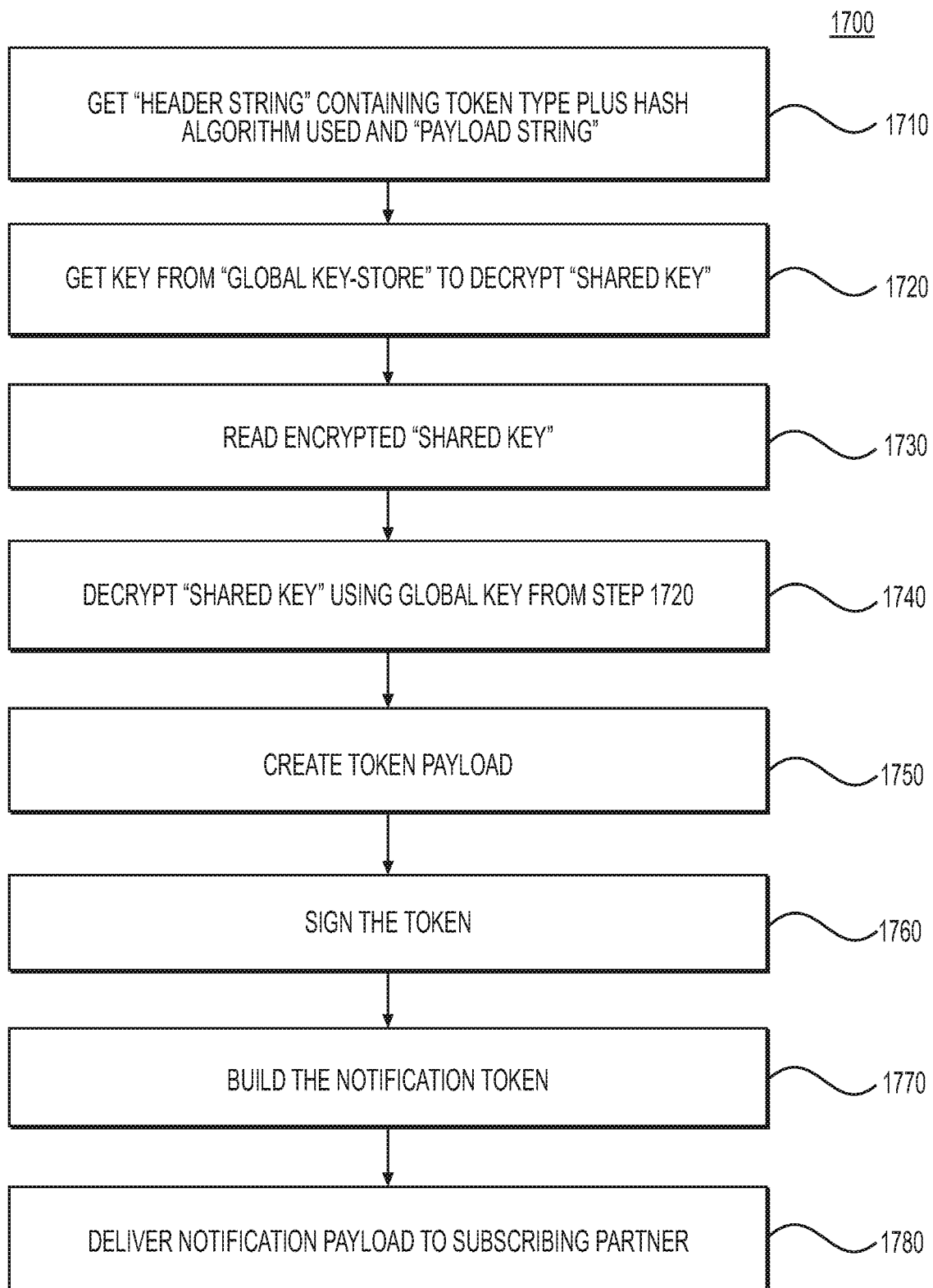
FIG. 17 is a flow chart depicting an example process for secure transmission of computer server event notifications, according to one or more embodiments.

FIG. 17 depicts a flow chart of an example method for secure transmission of computer server event notifications, according to one or more embodiments. In operation 1710, the server may get a header string containing a designation of a type of a token and a designation of a hashing algorithm used as well as a payload string that may contain claims information including epoch time. For example, the server may receive a JSON header string such as "{"typ":"JWT", "alg":"HS256"}," where the type is designated as "JWT" and the hashing algorithm is designated as "HS256." The server may likewise receive a JSON payload string, such as, for example, "{"iss":"ESAuthIDP","exp":<ExpiryTime (EpochTimeInSeconds+300seconds)>,"http://vantiv.com/ esauth/api/Notification/id":<NotificationID>}." In operation 1720, the server may obtain a key, from a global key-store, such as global key-store 1320 depicted in FIG. 13. In operation 1730, the server may read a subscribing partner's encrypted shared key. In operation 1740, the server may decrypt a cipher text obtained in operation 1730 using key obtained in operation 1720. In operation 1750, the server may create a token payload by formatting the header string and payload string received in operation 1710. In operation 1760, the server may sign the token using the token payload created in operation 1750 and the decrypted shared key obtained in operation 1740. For example, the server may generate a JSON we signature such as:

"Input for MAC creation" = [Base64UrlEncode { UTF-8 (JSON Header String) } ] ||
"." || [Base64UrlEncode { UTF-8 (JSON Payload String) } ]
JWS = [Base64UrlEncode { UTF-8 ( MAC Byte array ("Input for MAC creation"
with "HMACSHA256 Shared Secret Key")) } ]

In operation 1770, the server may format a notification token using the header string and payload string in received in operation 1710 and signature of the token payload from operation 1760 resulting in a notification payload. A notification payload may be of the form: "<[Base64UrlEncode {UTF-8 (JSON Header String)}]||". "|[Base64UrlEncode {UTF-8 (JSON Payload String)}]||". "|[Base64UrlEncode {UTF-8 (JWS)}]>". An example notification payload may contain, for example:
    contentType: application/json
    Authorization_Token: Vantiv
    jwt="eyJ0eXAiOiJKV1QiLCJhbGciOiJIUzI1NiJ9.
      eyJpc3MiOiJWYW50aXYiLCJleHAiOjEyMzQ1
      NTY2NywiaHR0cDovL3ZhbnRpdi5jb20vZXNhd XRoL2FwaS9Ob3RpZmIjYXRpb24vaWQiOjEy
MzQ1Nn0.O0b1Z-ixtPcHFmtiwISwoNqSRznCa-
Iig KqAoznIxWE"

In operation 1780, the server may deliver the notification payload from 1770 to the subscribing partner via a service gateway, such as service gateway 130 depicted in FIG. 1.

One or more embodiments may provide additional benefits not realized by conventional methods. For example, the same shared secret key may be used for all topic subscriptions for a subscriber, which may simplify a partner's integration of JSON Web Token validation. JSON web token validation may protect a partner's endpoint that accepts data about notification identification and may provide data integrity. Access and data claims related to topic subscriptions and notification details may be added to a partner's license, if existing, or a new license may be created.

A method according to one or more embodiments mat employ two separate key stores. For example a global key store and a partner key-store may be employed. A global key store may hold a key used to protect a partner's shared key. A partner key-store may hold shared keys for partners in an encrypted form.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for controlled transmission of computer server event notifications, the method comprising:

receiving, by a notification server, a subscription registration request from a partner system, the subscription registration request comprising at least one event type;

generating, by the notification server, a notification associated with one or more computer server events of the at least one event type in accordance with a quantity threshold indicating a number of server events to associate with the notification, the quantity threshold calculated based on at least one of the at least one event type, the partner system, and a current time;

transmitting, by the notification server, the notification to the partner system in accordance with a time threshold indicating a predetermined time period to associate with the notification, the time threshold calculated based on at least one of the at least one event type, the partner system, and a current time;

receiving, by the notification server, a request for computer server event details from the partner system; and transmitting, by the notification server, the computer server event details to the partner system in response to the received request.

2. The method of claim 1, wherein the time threshold defines a length of a time period between two consecutive notifications.

3. The method of claim 2, wherein the quantity threshold defines a minimum number of computer server events to include in the notification.

4. The method of claim 3, wherein, if the time threshold is reached before the quantity threshold is reached, the notification is transmitted to the partner system before the quantity threshold is reached.

5. The method of claim 2, wherein the quantity threshold defines a maximum number of computer server events to include in the notification.

6. The method of claim 5, wherein, if the quantity threshold is reached before the time threshold is reached, the notification is transmitted to the partner system before the time threshold is reached.

7. The method of claim 1, further comprising:
publishing, by the notification server, an application programming interface (API) for secure communication with the partner system over a computer network, the API corresponding to an API published by a service gateway,
wherein the notification is transmitted over the computer network by way of the API published by the service gateway.

8. The method of claim 7, wherein the API published by the service gateway include features for secure transmission of notifications.

9. The method of claim 8, wherein the features for secure transmission of notifications include one or more of message authentication codes (MAC), JavaScript Object Notation (JSON) Web Tokens (JWT), and Hypertext Transfer Protocol Secure (HTTPS).

10. The method of claim 8, wherein the API published by the service gateway include interfaces for receiving computer server events from external services.

11. A system for controlled transmission of computer server event notifications, the system comprising:
at least one processor; and
at least one data storage comprising instructions which, when executed by the at least one processor, cause the at least one processor to perform a method comprising:
receiving, by a notification server, a subscription registration request from a partner system, the subscription registration request comprising at least one event type;
generating, by the notification server, a notification associated with one or more computer server events of the at least one event type in accordance with a quantity threshold indicating a number of server events to associate with the notification, the quantity threshold calculated based on at least one of the at least one event type, the partner system, and a current time;
transmitting, by the notification server, the notification to the partner system in accordance with a time threshold indicating a predetermined time period to associate with the notification, the time threshold calculated based on at least one of the at least one event type, the partner system, and a current time;
receiving, by the notification server, a request for computer server event details from the partner system; and
transmitting, by the notification server, the computer server event details to the partner system in response to the received request.

12. The system of claim 11, wherein the time threshold defines a length of a time period between two consecutive notifications.

13. The system of claim 12, wherein the quantity threshold defines a minimum number of computer server events to include in the notification.

14. The system of claim 13, wherein, if the time threshold is reached before the quantity threshold is reached, the notification is transmitted to the partner system before the quantity threshold is reached.

15. The system of claim 12, wherein the quantity threshold defines a maximum number of computer server events to include in the notification.

16. The system of claim 15, wherein, if the quantity threshold is reached before the time threshold is reached, the notification is transmitted to the partner system before the time threshold is reached.

17. A non-transitory computer readable medium for controlled transmission of computer server event notifications, the non-transitory computer readable medium comprising instructions which, when executed by at least one processor, cause the at least one processor to perform a method comprising:
receiving, by a notification server, a subscription registration request from a partner system, the subscription registration request comprising at least one event type;
generating, by the notification server, a notification associated with one or more computer server events of the at least one event type in accordance with a quantity threshold indicating a number of server events to associate with the notification, the quantity threshold calculated based on at least one of the at least one event type, the partner system, and a current time;
transmitting, by the notification server, the notification to the partner system in accordance with a time threshold indicating a predetermined time period to associate with the notification, the time threshold calculated based on at least one of the at least one event type, the partner system, and a current time;
receiving, by the notification server, a request for computer server event details from the partner system; and
transmitting, by the notification server, the computer server event details to the partner system in response to the received request.

18. The non-transitory computer readable medium of claim 17, wherein the method further comprises:
publishing, by the notification server, an application programming interface (API) for secure communication with the partner system over a computer network, the API corresponding to an API published by a service gateway,
wherein the notification is transmitted over the computer network by way of the API published by the service gateway.

19. The non-transitory computer readable medium of claim 18, wherein the API published by the service gateway include features for secure transmission of notifications.

20. The non-transitory computer readable medium of claim 19, wherein the features for secure transmission of notifications include one or more of message authentication codes (MAC), JavaScript Object Notation (JSON) Web Tokens (JWT), and Hypertext Transfer Protocol Secure (HTTPS).

\* \* \* \* \*